(12) United States Patent
Krebs et al.

(10) Patent No.: US 10,498,883 B1
(45) Date of Patent: Dec. 3, 2019

(54) MULTI-MODAL COMMUNICATIONS RESTRICTIONING

(71) Applicant: Amazon Technologies, Inc., Seattle, WA (US)

(72) Inventors: Jacob Krebs, Seattle, WA (US); Kwang Ho Ok, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 15/948,641

(22) Filed: Apr. 9, 2018

(51) Int. Cl.
| H04M 3/38 | (2006.01) |
| H04W 8/18 | (2009.01) |
| H04W 8/20 | (2009.01) |
| H04M 3/42 | (2006.01) |
| G10L 15/26 | (2006.01) |
| G10L 15/22 | (2006.01) |

(52) U.S. Cl.
CPC .............. *H04M 3/387* (2013.01); *G10L 15/22* (2013.01); *G10L 15/26* (2013.01); *H04M 3/42204* (2013.01); *H04W 8/186* (2013.01); *H04W 8/20* (2013.01); *G10L 2015/223* (2013.01)

(58) Field of Classification Search
CPC ........ H04M 3/387; H04M 3/38; H04M 1/677; H04W 8/186; H04W 8/20
USPC .............. 379/200, 188, 194, 201.01, 207.15, 379/207.02, 201.02
See application file for complete search history.

(56) References Cited

U.S. PATENT DOCUMENTS

| 2011/0026704 | A1* | 2/2011 | Connelly | ............... H04L 63/102 379/219 |
| 2017/0231014 | A1* | 8/2017 | Patel | ....................... H04W 4/10 |

* cited by examiner

*Primary Examiner* — Thjuan K Addy
(74) *Attorney, Agent, or Firm* — Pierce Atwood LLP

(57) ABSTRACT

Techniques for only "ringing" devices configured as restricted devices when a communication is intended and approved for a restricted user. A first user may indicate to a system that the first user wants to communicate with a second user. The system may determine a group account including the second user. The system may also determine one or more devices specifically associated with the second user in the group account. The system may cause only the device(s) associated with the second user—but not other devices of the group profile not specifically associated with second user—to receive the communication. Techniques for permitting a restricted device to send or commence communications based on at least one access parameter.

20 Claims, 13 Drawing Sheets

FIG. 6

| User Identifier | Communications Identifier | Device Identifiers | Access Parameters |
|---|---|---|---|
| 2345 | 9012 | 5678 | Access Parameter 1 |
|  |  | 6789 | Access Parameter 2 |

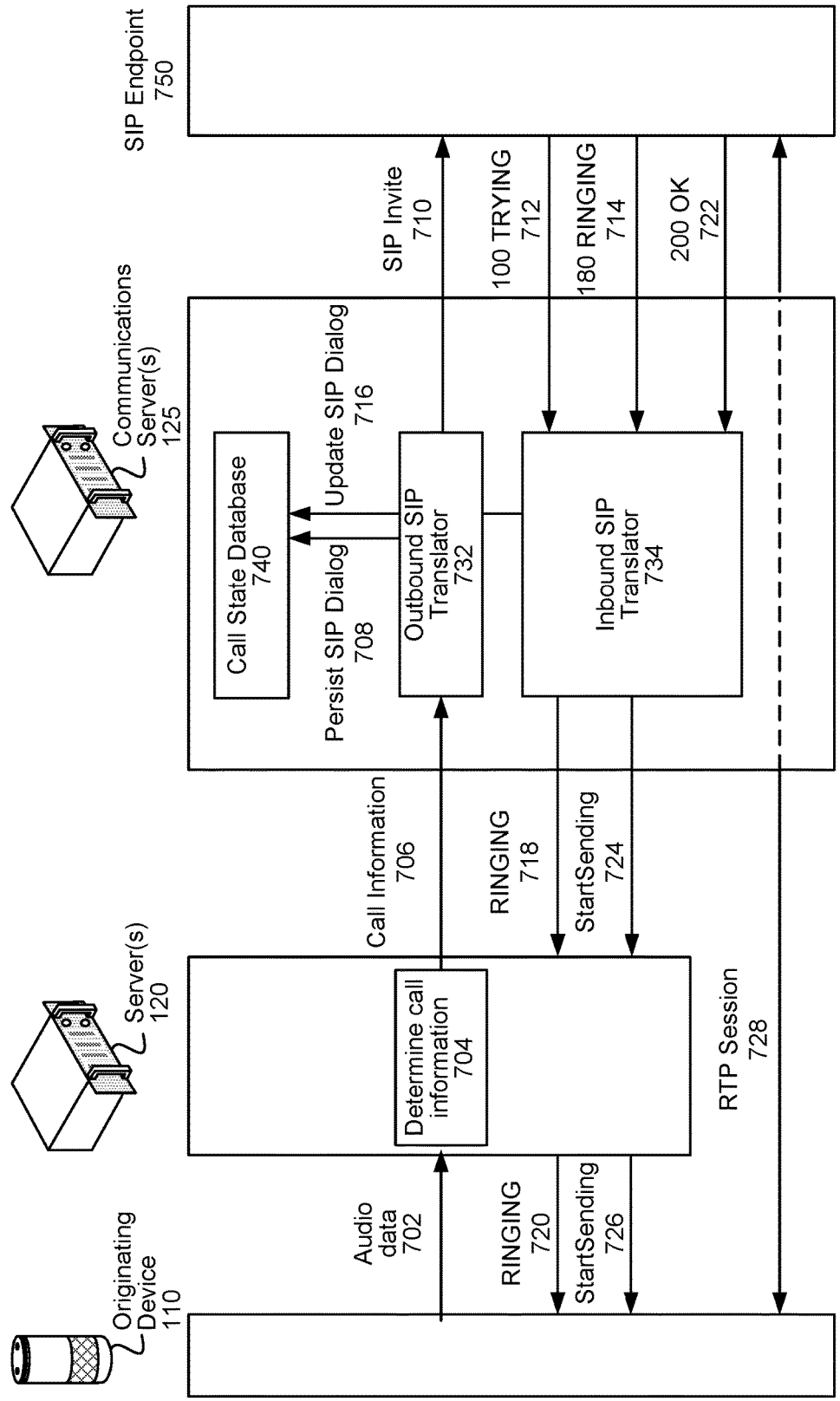

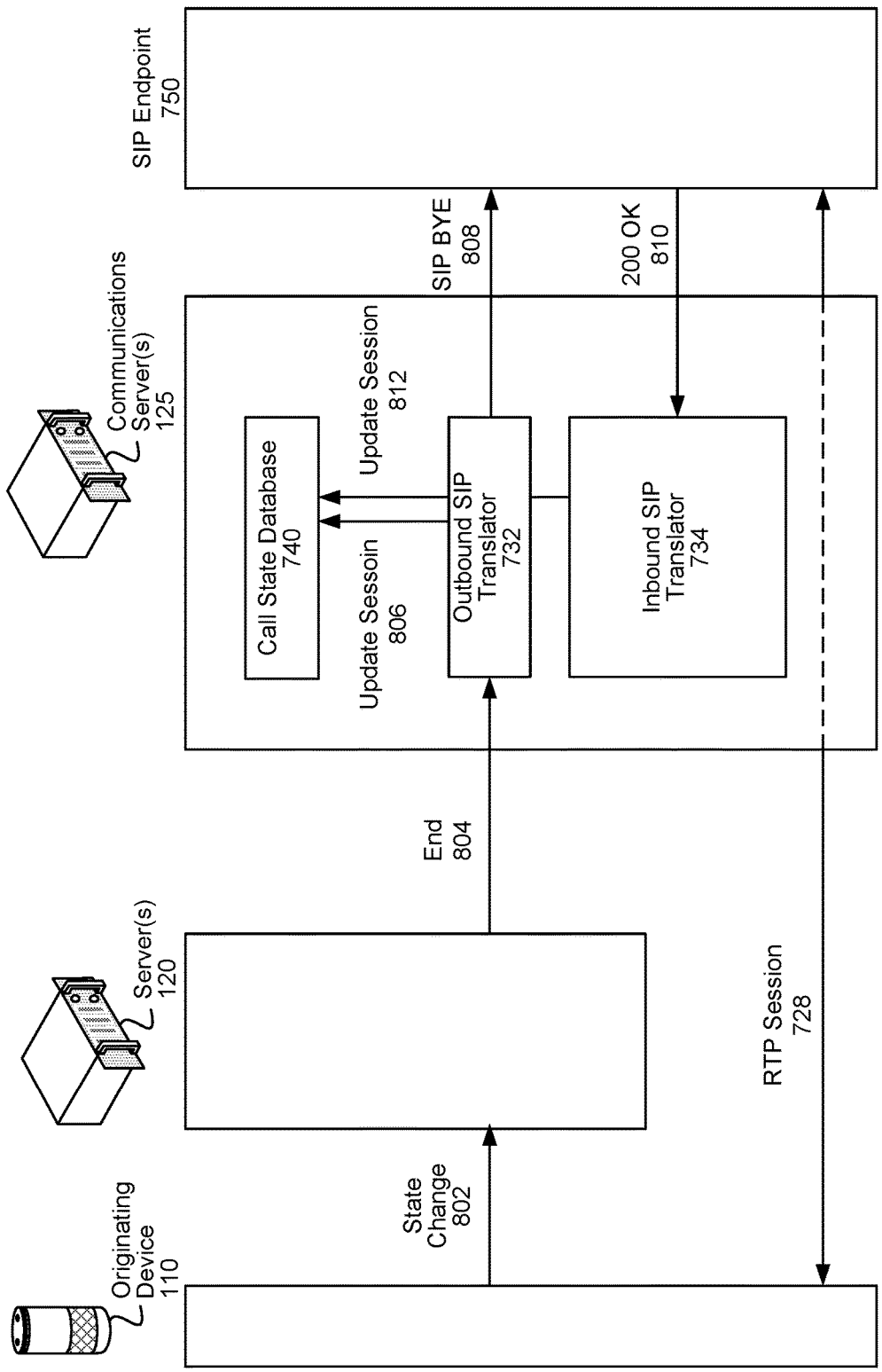

MULTI-MODAL COMMUNICATIONS RESTRICTIONING

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 is a conceptual diagram of a communications profile of a restricted user according to embodiments of the present disclosure.

FIG. 7 illustrates an example of signaling to initiate a communication session according to embodiments of the present disclosure.

FIGS. 8A and 8B illustrate examples of signaling to end a communication session according to embodiments of the present disclosure.

DETAILED DESCRIPTION

Figure 1:
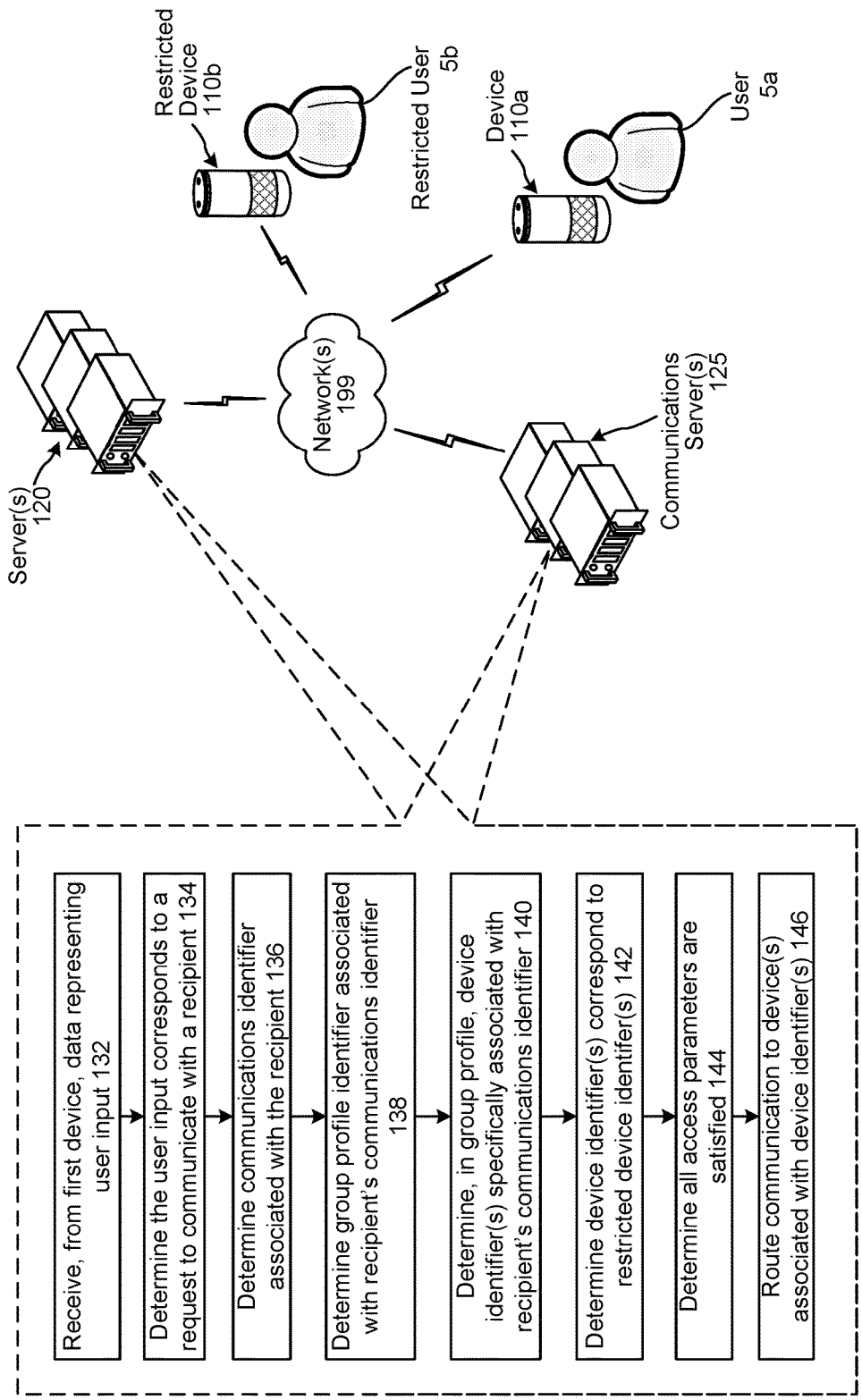
FIG. 1 illustrates a system configured to send communications to a restricted device according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

A system may be configured to perform communications based on user speech. For example, if a user says "Alexa, tell John I am hosting a football viewing party," a device local to the user may send audio representing the user's speech to one or more servers. The server(s) may then send audio or text representing the message to a device associated with "John." In another example, if a user says "Alexa, call John," a device local to the user may send audio representing the user's speech to the server(s). The server(s) may thereafter establish a two-way communication channel between the device of the user and a device associated with "John."

Systems are increasingly including communal devices. A communal device may be a device that is used by multiple users. For example, a communal device may be a device located in a household that more than one user of the household can interact with. A household, or other location, may include more than one communal device.

The system may include group profiles. Each group profile may be associated with more than one user profile and more than one user device. An example of a group profile is a household profile that is linked to or otherwise associated with user profiles for each member of the household. The household profile may also be linked to or otherwise associated with devices in the household (or linked to the users of the household even if the device is not specifically located in the household).

Certain systems may "ring" every device of a group profile when a communication is intended for a recipient associated with the group profile. For example, if a user says "Alexa, tell John I am hosting a football viewing party," a device local to the user may send audio representing the user's speech to one or more servers. The server(s) may then determine a user identifier unique to "John," determine a group profile including John's unique identifier, and cause each user device represented in the group profile to output an indicator that John is receiving a message. In this example, each device in John's household may "ring" and announce an incoming message for John. In another example, if a user says "Alexa, call John," a device local to the user may send audio representing the user's speech to the server(s). The server(s) may then determine a user identifier unique to "John," determine a group profile including John's unique identifier, and cause each user device represented in the group profile to output an indicator that John is receiving a call. An indicator that a recipient is receiving a message or call may be embodied by a light ring of a device being activated, for example. In this example, each device in John's household may "ring" and announce an incoming call for John.

Devices are often used by different members of a household, which may include restricted users (e.g., children). Use by restricted users may need to be limited in ways adult use need not be. For example, it may be undesirable for a restricted user to use a device to access social media, send messages to recipients, receive calls, etc. when the restricted user is supposed to be doing their homework, sleeping, etc.

Certain devices may be equipped as "restricted devices," which means the devices are only permitted to engage in certain activities that may be configured and/or approved by a parent/guardian of the restricted user. The parent/guardian may have their own user identifier that is linked to the restricted user in a household profile or otherwise.

While it has been described that a restricted device may be used by a child, thereby being connoted as a child device, a restricted device may be used by other types of users. For example, a restricted device envisioned by the present disclosure includes an office device, employee device, publicly-accessible device, or other type of device that is restricted from access certain functionality offered by the system within which the restricted device is implemented.

The present disclosure improves upon existing systems by only "ringing" devices configured as restricted devices when a communication is intended for the restricted user. According to the present disclosure, for example, if a user says "Alexa, tell John I will see him at school tomorrow," a system may determine a user identifier unique to "John," determine a group profile including John's unique identifier, determine device identifiers included in the group profile, determine device identifiers specifically associated with the recipient "John," determine at least one access parameter associated with the device identifiers, determine the access parameter(s) represents John can be contacted, and cause only the device(s) associated with John—but not other devices of the group profile not specifically associated with John—to output an indicator that John is receiving a message. In another example, if a user says "Alexa, call John," a system may determine a user identifier unique to "John," determine a group profile including John's unique identifier, determine device identifiers included in the group profile, determine device identifiers specifically associated with the recipient "John," determine at least one access parameter associated with the device identifiers, determine the access parameter(s) represents John can be contacted, and cause only the device(s) associated with John—but not other devices of the group profile not specifically associated with John—to output an indicator that John is receiving a call.

A system according to the present disclosure may implement various filters to limit when a restricted user (e.g., a child) can communicate through a restricted device as well as who can communicate with the restricted user through the restricted device. A parent of a restricted user may set usage parameters for the restricted user or particular restricted device. For example, a parent may set an access policy that prevents a system from routing a communication to a restricted device after a certain time of day (e.g., when the restricted user should be sleeping, doing homework, etc.). A parent may also indicate which communication originators (e.g., communication originating device or user) the restricted device can receive communications from. For example, a parent may generate a whitelist of contacts that may communicate with a restricted user via a restricted device. When a communication is received by the system, the system may determine one or more restricted devices intended to receive the communication, check whether the communication origination source is represented in the whitelist of contacts associated with the restricted device(s), and only route the communication to the restricted device(s) if the communication originator is represented in the whitelisted contacts.

The system may also implement various filters that affect a restricted user's ability to send or receive communications. For example, a parent may set an access policy that prevents a system from routing a communication from a restricted device after a certain time of day. For further example, a parent may generate a whitelist of contacts that a restricted user may send communications to. Thus, a restricted device may be limited to: sending communications to only whitelisted contacts, only during certain times of day; receiving communications from only whitelisted contacts, only during certain times of day; child-safe web browsing; accessing child-safe audio books; accessing child-safe videos and images; invoking only parent-approved speechlets; etc.

A restricted device may be located at a restricted user specific location, such as a restricted user's bedroom, playroom, etc. Thus, the system is, at least in part, directed to tailoring communication experiences to be safe for the restricted user (e.g., child safe).

A "restricted user" as used herein refers to an individual that is under the legal control of another individual. A restricted user does not necessarily imply a certain age of a user as certain older individuals may nonetheless be restricted users do to their diminished mental capacity, an employee/employer relationship, etc.

FIG. 1 illustrates a system configured to send communications to a restricted device. Although the figures and discussion of the present disclosure illustrate certain operational steps of the system in a particular order, the steps described may be performed in a different order (as well as certain steps removed or added) without departing from the intent of the disclosure. A device 110a local to a user 5a, a restricted device 110b local to a restricted user 5b, one or more servers 120, and one or more communications servers 125 may communicate across one or more networks 199.

The user 5a may provide the device 110a with user input. For example, the user input may correspond to speech of the user 5a, in which case the device 110a may generate audio data representing the speech and send the audio data to the server(s) 120. For further example, the user input may correspond to text, in which case the device 110a may generate text data representing the text and send the text data to the server(s) 120. The server(s) 120 receives (132) data (e.g., audio data or text data) representing the user input.

The server(s) 120 determines (134) the user input corresponds to a request to communicate with a recipient. For example, the user input may correspond to a request to call a recipient. Such a request may correspond to "Alexa, call John" or "call John." For further example, the user input may correspond to a request to send a recipient a message. Such a request may correspond to "Alexa, tell John I will see him at school tomorrow" or a text message with the substance corresponding to "I will see you tomorrow."

After determining the user input corresponds to a communication request, the server(s) 120 may send data representing the communication request and the recipient to the communications server(s) 125. For example, the data representing the communication request and the recipient may be NLU results data as described below.

The communications server(s) 125 determines (136) a communications identifier associated with the recipient. Users of the system may enable communications functionality offered by the system. When a user enables communications functionality, the system may generate a communications identifier unique to the user.

The communications server(s) 125 may access a contact list associated with the user 5a or device 110a that originated the audio data corresponding to the communication request. The communications server(s) 125 may determine the name of the recipient ("John" in the foregoing examples) corresponds to a particular entry in the contact list and may determine a communications identifier associated with the entry.

The communications server(s) 125 determines (138) a group profile identifier associated with the recipient's communications identifier. The system may store group profiles, such as household profiles, for example. Each group profile may include one or more device identifiers, with each device identifier being associated with a different user device 110. Each group profile may also include one or more user identifiers, with each user identifier being associated with a different user of the group profile. Thus, the communications server(s) 125 may determine a group profile, represented by a group profile identifier, including the recipient's communications identifier.

The communications server(s) 125 determines (140), in the group profile, one or more device identifiers specifically associated with the recipient's communications identifier. A device identifier may simply be associated with a group profile identifier, meaning the device, associated with the device identifier, is associated with all users of the group profile, rather than any particular user of the group profile. Alternatively, a device identifier may be associated with a particular user identifier included in the group profile, meaning the device, associated with the device identifier, is specifically associated with the user represented by the user identifier.

The communications server(s) 125 determines (142) the one or more device identifiers correspond to restricted device identifiers. A "restricted device" refers to a device associated with access parameters. Such access parameters may relate to, for example, who can contact a user of the restricted device, when a user of the restricted device can be contacted, etc. Thus, the communications server(s) 125 may determine the one or more device identifiers correspond to restricted device identifiers by determining each device identifier(s) is associated with at least one access parameter. For example, the communications server(s) 125 may determine the restricted device 110b is represented by a device identifier associated with at least one access parameter.

A particular recipient's communications identifier may be associated with more than one restricted device identifier. Each of the restricted device identifiers may be associated with the same access parameters. This results in the restricted devices associated with the restricted device identifiers acting in conformity such that one restricted device does not output a communication (or notification thereof) when another restricted device, associated with the recipient's communications identifier, does not.

While the present disclosure details the benefits of the present disclosure with respect to child use of a "restricted device," one skilled in the art will appreciate that the present disclosure may relate to devices that are used by non-child users but that are associated with access parameters as described herein.

As described, access parameters may dictate who can cause a communication to be output by the restricted device 110b and/or when the restricted device 110b can be caused to output a communication (or notification thereof). The communications server(s) 125 determines whether all of the access parameters associated with restricted device identifier(s) are satisfied. For example, an access parameter may indicate the restricted device 110b may only output communications (or notifications thereof) originating from certain sources (e.g., users, devices, etc.). Thus, the restricted device's identifier may be associated with a whitelist of sources that may cause the restricted device 110b to output a communication (or notification thereof). For further example, an access parameter may indicate the restricted device 110b may only output communications (or notifications thereof) during certain times of day (or the access parameter may indicate the restricted device 110b may not output communications (or notifications thereof) during certain times). Thus, the communications server(s) 125 may determine a current time (e.g., by receiving a current time from an electronic clock service of the system) and determine whether the access parameter permits the communication (or notification thereof) to be output at the current time.

If the communications server(s) 125 determines (144) all of the access parameters associated with the restricted device identifier(s) are satisfied, the communications server(s) 125 routes (146) the communication to the device(s) (including the restricted device 110b) associated with the device identifier(s) associated with the recipient's communications identifier (but does not route the communication to other devices represented within the same group profile). This may result in each of the devices associated with the recipient outputting the communication (or a notification thereof).

If the communications server(s) 125 determines at least one of the access parameters associated with the restricted device identifier(s) are not satisfied, the communications server(s) 125 prevents routing of the communication to the device(s). Such prevention may result in the communications server(s) 125 queuing the communication until communications are permitted to be output by the restricted device(s) (including the restricted device 110b), at which time the communications server(s) 125 may cause the restricted device(s) to output a notification of the communication. For example, the notification may represent the originating user, the time the communication originated, and the content of the communication. Alternatively, the communications server(s) 125 may send data representing the originating user, the time the communication originated, and the communication content to the restricted device(s) upon determining at least one access parameter is not satisfied, along with an instruction to not output the data (or a notification of such) until a certain time (e.g., a time when the restricted device(s) is again permitted to output communications or notifications thereof).

Described above is processing that may be performed when a user 5a is attempting to send a communication to or commence a communication with a restricted user 5b. As described, only the device(s) associated with the restricted user 5b are used to output the communication (or an indication thereof). When a user 5a attempts to send a communication to or commence a communication with a user of a group profile and the user is not indicated as a restricted user, the system may output the communication (or an indication thereof) using all devices of the group profile except the devices represented as restricted devices. For example, when the system receives a communication, the system may determine the intended recipient, determine a group profile associated with the intended recipient, determine the group profile does not represent any devices as being specifically associated with the recipient, and cause all devices (except devices associated with specific users) in the group profile to output the communication (or an indication thereof).

Figure 2:
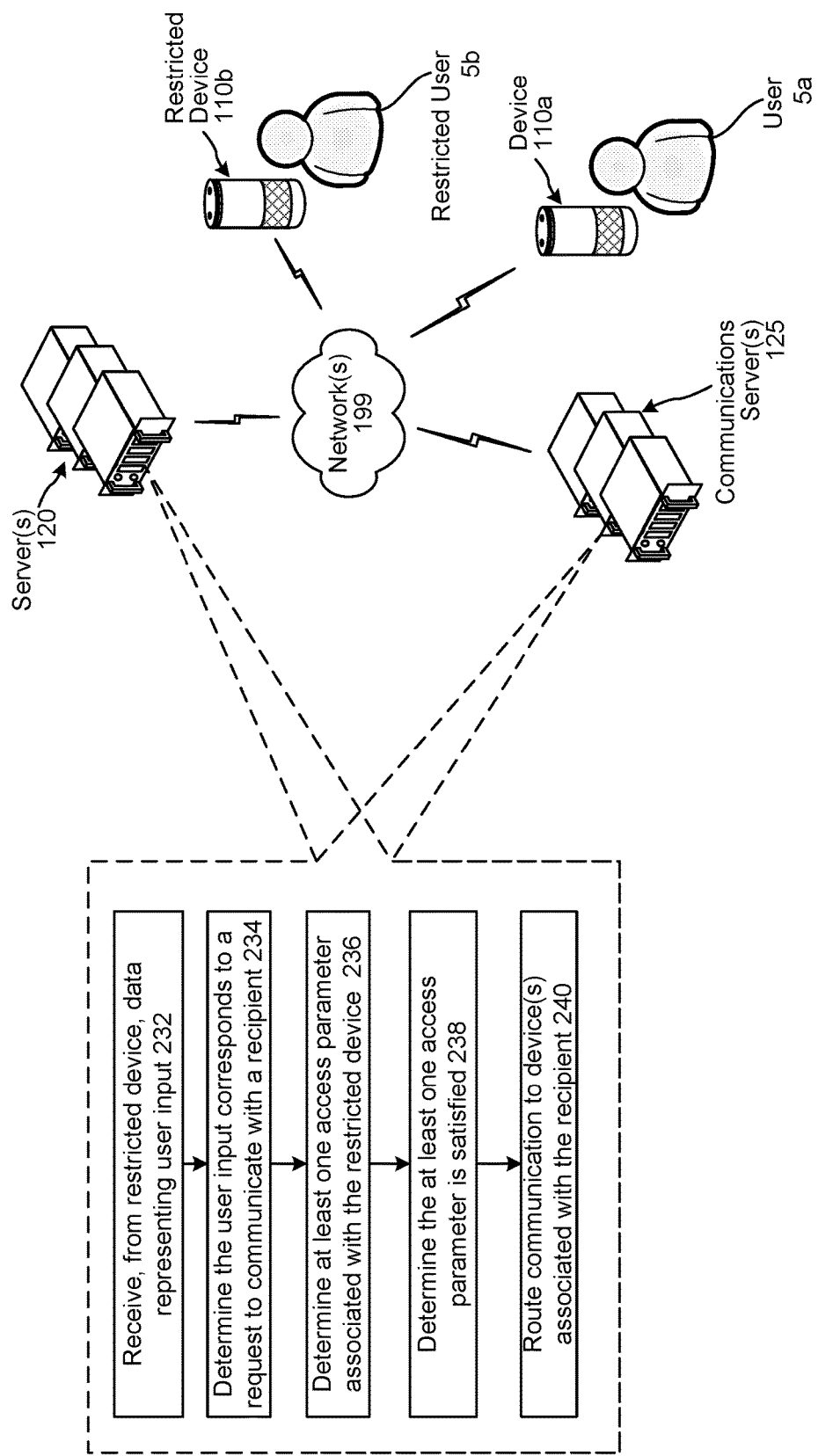
FIG. 2 illustrates a system configured to send communications from a restricted device according to embodiments of the present disclosure.

FIG. 2 illustrates a system that may send communications from the restricted device 110b. The restricted user 5b may provide the restricted device 110b with user input. For example, the user input may correspond to speech of the user 5b, in which case the restricted device 110b may generate audio data representing the speech and send the audio data to the server(s) 120. For further example, the user input may correspond to text, in which case the restricted device 110*b* may generate text data representing the text and send the text data to the server(s) 120. The server(s) 120 receives (232) data (e.g., audio data or text data) representing the user input.

A restricted device as envisioned by the present disclosure may be a device manufactured specifically for restricted user use (e.g., child user) or may be a device manufactured for general use but which is later converted into a restricted device by virtue the general use device becoming associated with one or more access parameters.

The server(s) 120 determines (234) the user input corresponds to a request to communicate with a recipient. Such determination may involve performing speech processing, such as ASR processing and/or NLU processing.

After determining the user input corresponds to a communication request, the server(s) 120 may send data representing the communication request and the recipient to the communications server(s) 125. For example, the data representing the communication request and the recipient may be NLU results data as described below.

The communications server(s) 125 determines (236) at least one access parameter associated with the restricted device 110*b* (and more particularly the restricted device's identifier), from which the communication request was received. For example, the at least one access parameter may represent when the restricted device 110*b* may be used to send or commence a communication, who the restricted device 110*b* may be used to communicate with, how a communication may be commenced using the restricted device 110*b* (e.g., a communication may not be originated by speaking the phone number of the recipient, with the exception that digit dialing may be permitted with respect to emergency numbers), etc.

The communications server(s) 125 determines whether all of the at least one access parameter are satisfied. For example, an access parameter may indicate the restricted device 110*b* may only be used to send communications to or commence communications with certain recipients (e.g., users, devices, etc.). Thus, the restricted device's identifier may be associated with a whitelist of recipients that may be contacted using the restricted device 110*b*. For further example, an access parameter may indicate the restricted device 110*b* may only be used to send communications to or commence communications during certain times of day (or the access parameter may indicate the restricted device 110*b* may not be used to send or commence communications during certain times). Thus, the communications server(s) 125 may determine a current time and determine whether the access parameter permits the communication to be sent or commenced at the current time. For yet further example, an access parameter may indicate the restricted device 110*b* may not be used to send communications to or commence communications with respect to digit dialed recipients (e.g., recipients which the restricted user 5*b* identified using the phone number digits thereof). Thus, the communications server(s) 125 may process the user input to determine how the restricted user 5*b* represents the recipient. If the recipient is represented as individual numbers of a phone number (or other communications number), the communications server(s) 125 may prevent the communication from being routed. The system may be configured with one or more exceptions to the digit dialing access parameter. For example, the communications server(s) 125 may permit a digit dialed communication request to be routed to the recipient if the digit dialed recipient corresponds to an emergency recipient (e.g., 911, a policy station, an ambulance dispatcher, etc.) or if the digit dialed recipient corresponds to a communications identifier represented in the whitelisted recipients.

If at least one of the access parameters associated with the restricted device 110*b* are not satisfied, the communications server(s) 125 may prevent the communication from being routed to the intended recipient and send the server(s) 120 an indication that the communication will not be routed as well as a reason for not routing the communication. The server(s) 120 may then cause the restricted device 110*b* to output an indication of such. For example, the server(s) 120 may send a signal to the restricted device 110*b* causing the restricted device 110*b* to output audio and/or display text corresponding to "I'm sorry but you are not permitted to [send a message/start a call] at this point in time" or "I'm sorry but you are not permitted to [send a message to/call] [recipient]," for example.

If the communications server(s) 126 determines (238) all of the at least one access parameter are satisfied, the communications server(s) 125 routes (240) the communication to a device(s) associated with the recipient. For example, if the spoken recipient is a whitelisted name of a user, the communications server(s) 125 may determine a device identifier(s) associated with the whitelisted name and route the communication to the device(s) associated with the device identifier(s).

As described with respect to FIGS. 1 and 2 above, the communications server(s) 125 may perform various processes involved between determining the user input corresponds to a communication request and routing the communication. Such a configuration may be based on system configurations. Thus, one skilled in the art will appreciate that some systems may be configured such that the server(s) 120 may perform some of the processes involved between determining the user input corresponds to a communication request and routing the communication.

Figure 3:
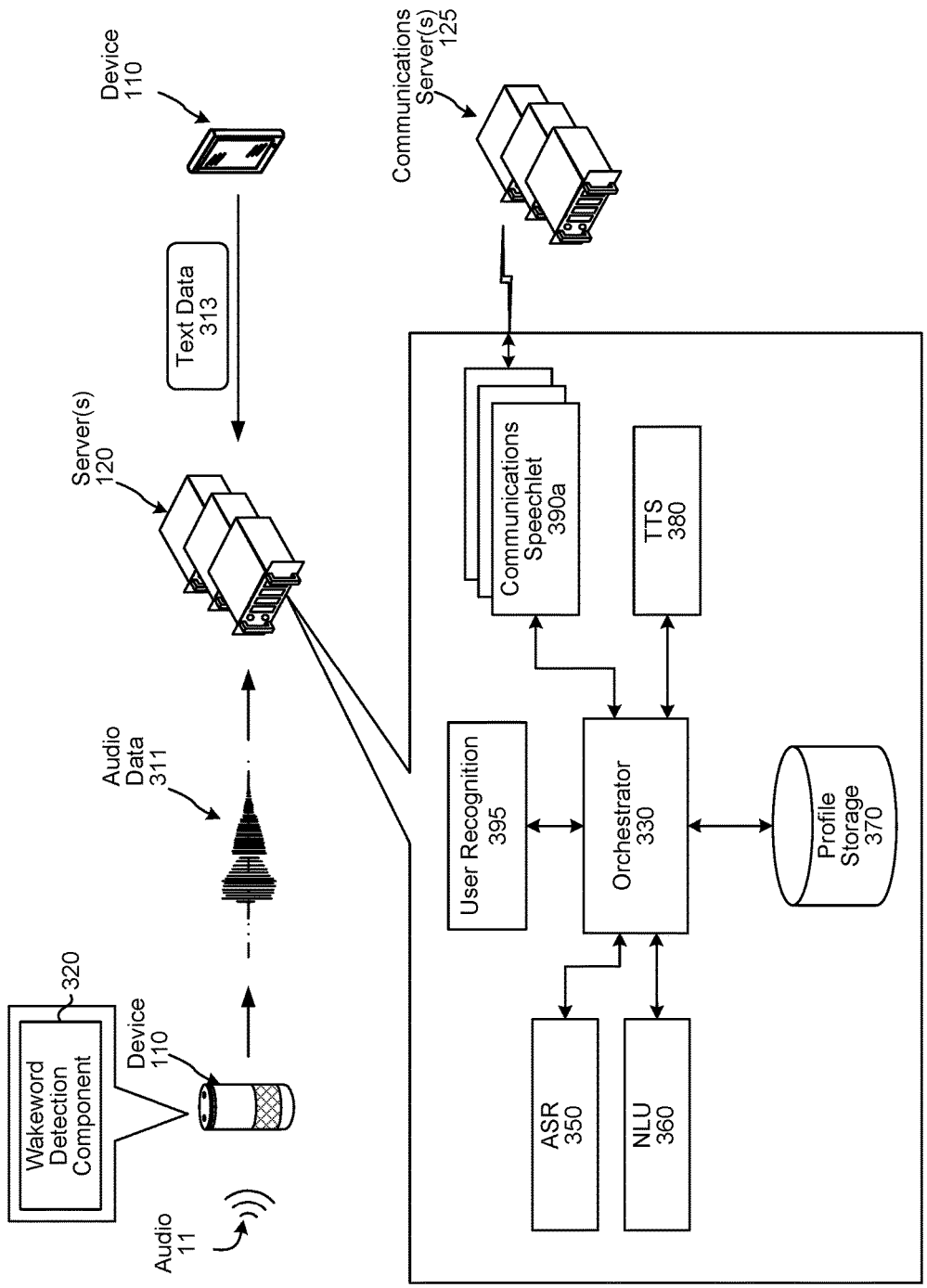
FIG. 3 is a conceptual diagram of components of a system according to embodiments of the present disclosure.

The system may operate using various components as described in FIG. 3. The various components may be located on same or different physical devices. Communication between various components may occur directly or across a network(s) 199.

An audio capture component(s), such as a microphone or array of microphones of the device 110, captures audio 11. The device 110, using a wakeword detection component 320, processes audio data, representing the audio 11, to determine if a keyword, such as a wakeword, is detected in the audio data. Following detection of a wakeword, the device 110 sends audio data 311, corresponding to user speech, to the server(s) 120.

The device 110 processes the audio data to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use the wakeword detection component 320 to perform wakeword detection to determine when a user intends to speak an input to the device 110. This process may also be referred to as keyword detection, with the wakeword being a specific example of a keyword. Keyword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a keyword.

Thus, the wakeword detection component 320 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another example, the wakeword detection component 320 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 311, representing the audio 11, to the server(s) 120. The audio data 311 may include data corresponding to the wakeword, or the portion of the audio data 311 corresponding to the wakeword may be removed by the device 110 prior to sending the audio data 311 to the server(s) 120.

Upon receipt by the server(s) 120, the audio data 311 may be sent to an orchestrator component 330. The orchestrator component 330 may include memory and logic that enables the orchestrator component 330 to transmit various pieces and forms of data to various components of the system, as well as perform other operations.

The orchestrator component 330 sends the audio data 311 to an ASR component 350. The ASR component 350 transcribes the audio data 311 into text data. The text data output by the ASR component 350 represents one or more than one (e.g., in the form of an N-best list) hypotheses representing an utterance represented in the audio data 311. The ASR component 350 interprets the speech in the audio data 311 based on a similarity between the audio data 311 and pre-established language models. For example, the ASR component 350 may compare the audio data 311 with models for sounds (e.g., subword units, such as phonemes, etc.) and sequences of sounds to identify words that match the sequence of sounds of the speech represented in the audio data 311. The ASR component 350 sends the text data generated thereby to an NLU component 360, either directly or via the orchestrator component 330. The text data sent from the ASR component 350 to the NLU component 360 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110 may send text data 313 to the server(s) 120. Upon receipt by the server(s) 120, the text data 313 may be sent to the orchestrator component 330. The orchestrator component 330 may send the text data 313 to the NLU component 360.

The NLU component 360 attempts to make a semantic interpretation of the phrases or statements represented in the text data input therein. That is, the NLU component 360 determines one or more meanings associated with the phrases or statements represented in the text data based on words represented in the text data. The NLU component 360 determines an intent representing an action that a user desires be performed as well as pieces of the input text data that allow a device (e.g., a device 110, the server(s) 120, the communications server(s) 125, etc.) to execute the intent. For example, if the text data corresponds to "call John," the NLU component 360 may determine an intent that the system establish a two-way communication channel between a device originating the call and a device of the recipient "John." For further example, if the text data corresponds to "tell John I said hi," the NLU component 360 may determine an intent that the system send a message (either a text message or an audio message), determine a recipient of "John," and determine message content of "I said hi."

The NLU component 360 outputs NLU results to the orchestrator component 330. The NLU results may include a representation of a single intent and corresponding slotted data that may be used by a downstream component to perform the intent. Alternatively, the NLU results data may include multiple entries, with each entry representing an intent and corresponding slotted data. Each entry may be associated with a confidence value representing a confidence of the NLU component 360 in the processing performed to generate the entry associated with the confidence value. The orchestrator component 330 may send the NLU results to an associated speechlet component 390. If the NLU results include multiple entries, the orchestrator component 330 may send a portion of the NLU results corresponding to the top scoring entry to a speechlet component 390 associated with the top scoring entry.

A "speechlet" or "speechlet component" may be software running on the server(s) 120 that is akin to a software application running on a traditional computing device. That is, a speechlet component 390 may enable the server(s) 120 to execute specific functionality in order to provide data, perform an action, or produce some other requested output. The server(s) 120 may be configured with more than one speechlet component 390. For example, a weather service speechlet component may enable the server(s) 120 to provide weather information, a car service speechlet component may enable the server(s) 120 to schedule a trip with respect to a taxi or ride sharing service, an order pizza speechlet component may enable the server(s) 120 to order a pizza with respect to a restaurant's online ordering system, a communications speechlet component 390a may enable the system to perform messaging or multi-endpoint communications, etc. A speechlet component 390 may operate in conjunction between the server(s) 120 and other devices such as a user local device 110 in order to complete certain functions. Inputs to a speechlet component 390 may come from various interactions and input sources.

The functionality described herein as a speechlet or speechlet component may be referred to using many different terms, such as an action, bot, app, or the like.

A speechlet component 390 may include hardware, software, firmware, or the like that may be dedicated to the particular speechlet component 390 or shared among different speechlet components 390. A speechlet component 390 may be part of the server(s) 120 (as illustrated in FIG. 3) or may be located at whole (or in part) with one or more separate servers.

Unless expressly stated otherwise, reference to a speechlet, speechlet device, or speechlet component may include a speechlet component operating within the server(s) 120 (for example as speechlet component 390) and/or speechlet component operating within a server(s) separate from the server(s) 120.

A speechlet component 390 may be configured to perform one or more actions. An ability to perform such action(s) may sometimes be referred to as a "skill." That is, a skill may enable a speechlet component 390 to execute specific functionality in order to provide data or produce some other output requested by a user. A particular speechlet component 390 may be configured to execute more than one skill. For example, a weather service skill may involve a weather speechlet component providing weather information to the server(s) 120, a car service skill may involve a car service speechlet component scheduling a trip with respect to a taxi or ride sharing service, an order pizza skill may involve a restaurant speechlet component ordering a pizza with respect to a restaurant's online ordering system, etc.

A speechlet component 390 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

The NLU results may simply represent an intent and slotted data associated with a communications speechlet 390a, or the NLU results may include a top scoring entry associated with a communications speechlet 390a. For example, the NLU results may represent a <SendMessage> intent or a <Call> intent, which both relate to sending or causing communications. In such a case, the orchestrator component 330 may send the NLU results (or a portion thereof associated with the communications speechlet 390a) to the communications speechlet 390a, which may in turn send the NLU results (or portion thereof) to the communications server(s) 125. The server(s) 120 may also send, to the communications server(s) 125, a user identifier and/or a device identifier associated with the present user input.

The communications server(s) 125 may perform various processes to determine if communications should be established or sent. The communications server(s) 125 may also perform processes necessary to establish or send communications.

In certain instances, the communications server(s) 125 (or the server(s) 120 depending on system configuration) may determine a communication should not be sent or established. Moreover, the communications server(s) 125 (or the server(s) 120) may desire a recipient be prompted of an incoming communication. The system may notify a user that a communication will not be sent or established, as well as notify a recipient of an incoming communication, using synthesized speech.

The server(s) 120 may include a TTS component 380 that generates audio data from text data using one or more different methods. Text data input to the TTS component 380 may represent that a communication will not be sent or established as well as a reason for same. Text data input to the TTS component 380 may also represent a notification of an incoming communication. Audio data generated by the TTS component 380 may then be output by a device 110 as synthesized speech.

In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to create audio data including an artificial speech waveform. Parametric synthesis uses a computerized voice generator, sometimes called a vocoder.

The server(s) 120 may include profile storage 370. The profile storage 370 may include a variety of information related to individual users, groups of users, etc. that interact with the system. The profile storage 370 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 370 may include one or more group profiles. Each group profile may be associated with a different group identifier. A group profile may be an umbrella profile specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a single group profile may additionally include preferences specific to the user associated therewith. That is, each user profile may include preferences unique from one or more other user profiles associated with the same group profile. A user profile may be a stand-alone profile or may be associated with a group profile.

A group profile may be associated with one or more device identifiers. A device identifier may be associated with every user identifier associated with the group profile. Alternatively, a device identifier may only be associated with a portion of the user identifiers associated with the group profile. Moreover, a device identifier, associated with only a portion of the user identifiers associated with the group profile, may be associated with access parameters as discussed herein. More than one device identifier may be associated with the same access parameters. For example, each device identifier specifically associated with a particular user identifier (as opposed to being associated with every user identifier of the group profile) may be associated with the same access parameters. This enables all of the devices associated with a given user to send messages, receive messages, and establish communications in a uniform manner.

The server(s) 120 may additionally store profiles used to track restricted user usage of the system. Such profiles may be associated with communications profiles, which are discussed further herein. Although such profiles are associated, communications may be performed using the communications profiles but not the profiles used to track restricted user usages. Nonetheless, communications performed using communications profiles may be represented in respective profiles that track restricted user usage of the system so parents may monitor restricted user communications.

The system may be configured to incorporate user permissions and may only perform activities disclosed herein if approved by a user. One user (e.g., a parent/guardian) may set permissions for another user (e.g., a restricted user such as a child). As such, the systems, devices, components, and techniques described herein would be typically configured to restrict processing where appropriate and only process user information in a manner that ensures compliance with all appropriate laws, regulations, standards, and the like. For example, the system may only receive and store child-related information (e.g., information required to interact with the user interface of the system) in a manner consistent with user permissions (e.g., with verified parental consent) and in accordance with applicable laws (e.g., the Children's Online Privacy Protection Act of 1998 (COPPA), the Children's Internet Protection Act (CIPA), etc.). The system and techniques can be implemented on a geographic basis to ensure compliance with laws in various jurisdictions and entities in which the component(s) of the system(s) and/or user are located.

The server(s) 120 may include a user recognition component 395 that recognizes one or more users associated with data input to the system. The user recognition component 395 may take as input the audio data 311, text data 313, and/or text data output by the ASR component 350. The user recognition component 395 determines scores indicating whether user input originated from a particular user. For example, a first score may indicate a likelihood that the user input originated from a first user, a second score may indicate a likelihood that the user input originated from a second user, etc. The user recognition component 395 also determines an overall confidence regarding the accuracy of user recognition operations. The user recognition component 395 may perform user recognition by comparing audio characteristics in the audio data 311 to stored audio characteristics of users. The user recognition component 395 may also perform user recognition by comparing biometric data (e.g., fingerprint data, iris data, etc.) received by the system in correlation with the present user input to stored biometric data of users. The user recognition component 395 may further perform user recognition by comparing image data (e.g., including a representation of at least a feature of a user) received by the system in correlation with the present user input with stored image data including representations of features of different users. The user recognition component 395 may perform additional user recognition processes, including those known in the art. Output of the user recognition component 395 may include a single user ID corresponding to the most likely user that originated the present input. Alternatively, output of the user recognition component 395 may include an N-best list of user IDs with respective scores indicating likelihoods of respective users originating the present input. The output of the user recognition component 395 may be used to inform NLU processing as well as processing performed by speechlet components 390.

Figure 4:
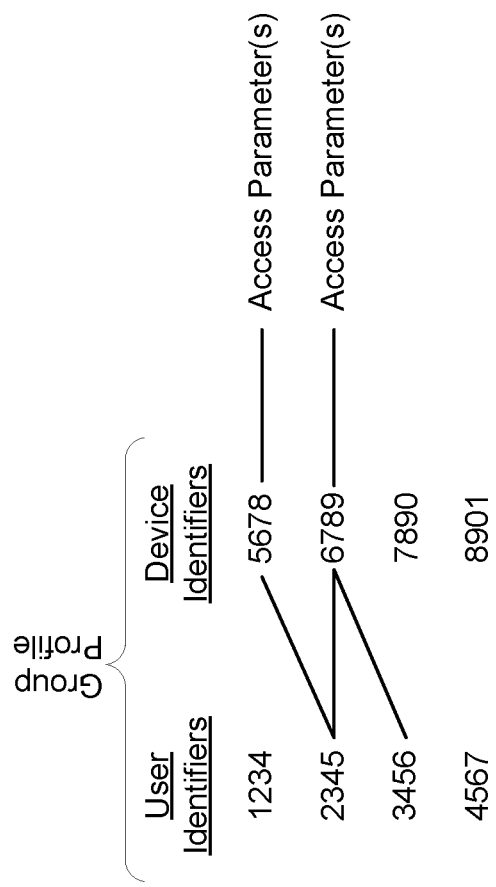
FIG. 4 is a conceptual diagram of a group profile according to embodiments of the present disclosure.

FIG. 4 conceptually illustrates certain information that may be included in a group profile. As illustrates, a group profile may include multiple user identifiers and multiple device identifiers. Some of the device identifiers may be associated with every user identifier (e.g., device identifiers 7890 and 8901). Other device identifiers may be specifically associated with particular user identifiers (e.g., device identifiers 5678 and 6789 are specifically associated with user identifier 2345). A device identifier may be associated with specifically access parameters (e.g., device identifiers 5678 and 6789 are associated with their respective access parameters). The access parameters may be stored as part of a group profile or may be stored separate from the group profile (e.g., in individual device and/or user profiles) but associated with the group profile.

A single device 110 may be associated with more than one restricted user. For example, as illustrated in FIG. 4, a device 110 represented by device identifier 6789 may be associated with restricted users represented by user identifiers 2345 and 3456. Thus, the device 110 represented by device identifier 6789 may be considered a restricted device of each of the restricted users represented by user identifiers 2345 and 3456. A device 110 associated with two different user identifiers may be associated with two different sets of access parameters (e.g., one set for one user and one set for the other user). As such, when a device receives a communication or receives a request to initiate a communication, the system may determine a user identifier of the communication recipient or sender (depending on the situation) and may determine the access parameters associated with the user identifier.

Figure 5:
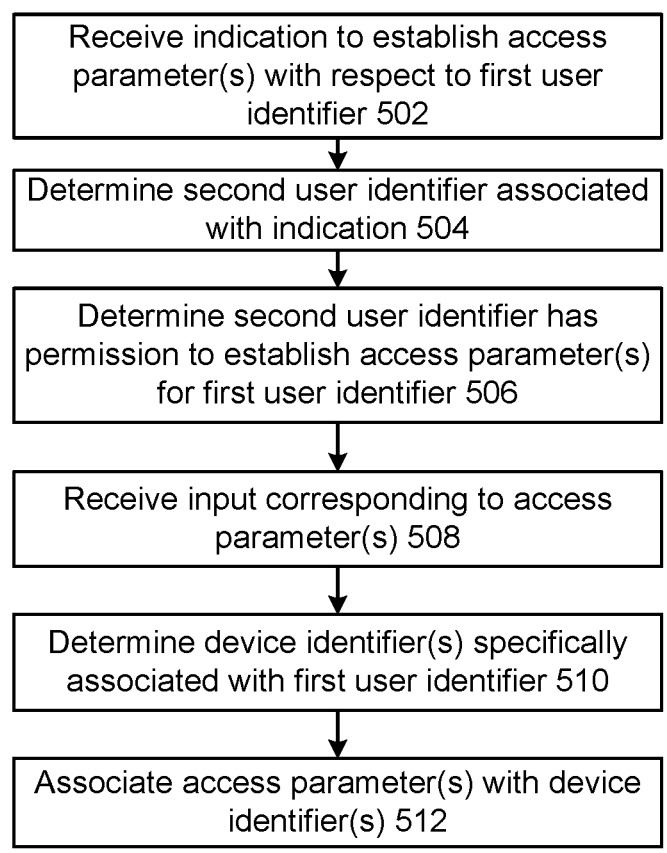
FIG. 5 is a process flow diagram illustrating how a device identifier may become associated with one or more access parameters according to embodiments of the present disclosure.

A parent user may establish different access parameters for each restricted user (as described in detail with respect to FIG. 5). If a single device 110 is associated with more than one restricted user and each of the restricted users is associated with one or more different access parameters, the system may need to perform user recognition to determine a present restricted user prior to determining which access parameter(s) to apply for a given outgoing communication of a restricted user.

FIG. 5 illustrates how a device identifier may become associated with one or more access parameters. The server(s) 120 receives (502) an indication to establish at least one access parameter with respect to a first user identifier. For example, a parent of a restricted user may interact with a companion application executed by a device 110 to indicate the parent wants to establish at least one access parameter for the restricted user. Thus, the first user identifier may be that of the restricted user.

The server(s) 120 determines (504) a second user identifier associated with the indication to establish at least one access parameter. The second user identifier corresponds to a user identifier of the user that originated the indication to establish the at least one access parameter. In the foregoing example, the second user identifier would be that of the parent user.

The server(s) 120 determines (506) the second user identifier has permission to establish access parameters for the first user identifier. A group profile may include data representing relationships between user identifiers. For example, a group profile may include a user identifier that is represented as a "primary" user of the group and may represent that one or more other user identifiers of the group profile may be influenced by actions performed with respect to the primary user identifier. According to the aforementioned example, the second user identifier (i.e., the user identifier of the parent) may be represented as a primary user identifier and the first user identifier (i.e., the user identifier of the restricted user) may be represented as servient to the second user identifier.

The server(s) 120 receives (508) input corresponding to at least one access parameter. The parent user may use the companion application executed by the device 110 to establish the one or more access parameters. For example, the parent user may indicate contacts (e.g., user identifiers, device identifiers, phone numbers, other communications identifiers, etc.) that may contact the restricted user, be used to contact the restricted user, or be contacted by the restricted user. The contacts indicated by the parent user may be selected by the parent user from the parent user's own contact list. During the process of selecting contacts from the parent user's contact list that should be represented in the access parameter, the parent user may rename the contact from a name that makes sense to the parent user to a name that makes sense to the restricted user (e.g., may rename a "mom" contact to "grandma," and the like). The contacts that the parent user indicates may become a whitelist of contacts (e.g., communications sources) as described above. When the parent user indicates a contact should be associated with the restricted user, the server(s) 120 may add a named entity for the existing contact in storage so the contact is associated with more than one named entity. For example, storage may initially represent a particular contact of the parent user as "mom." After the parent user indicates the contact should also be associated with the restricted user and renames the contact, the server(s) 120 may add the renamed entity (e.g., "grandma") to the existing contact so the contact is now associated with original named entity (e.g., "mom") and the renamed entity (e.g., "grandma"). For further example, the parent user may indicate when the restricted user may use a device 110 to perform a communication, when the restricted user may not use a device 110 to perform a communication, when the restricted user may be communicated with via a device 110, or when the restricted user may not be communicated with via a device 110. The parent user may indicate other access parameters not explicitly detailed herein.

The server(s) 120 determines (510) at least one device identifier specifically associated with the first user identifier of the restricted user. A parent user may indicate a device 110 is to be associated with a particular restricted user when the parent purchases the device 110 or otherwise sets up the device 110 after receiving the device 110. In response, the server(s) 120 may associate a device identifier of the device 110 with a user identifier of the restricted user. The server(s) 120 may persist such an association in a group profile representing the user identifier of the parent user and the user identifier of the restricted user. This type of association is illustrated the association between device identifier 5678 or device identifier 6789 with user identifier 2345 in FIG. 4.

The server(s) 120 associates (512) the access parameter(s) indicated by the parent user with the device identifier(s) specifically associated with the first user identifier of the restricted user. This association may be represented in the group profile representing the first user identifier and the device identifier(s), or may be represented in separate storage.

FIG. 6 illustrates a communications profile of a restricted user. As described, the server(s) 120 may include profile storage 370 representing various group profiles and user profiles. The communications server(s) 125 may include storage representing various communications profiles of various users of the system. A given communications profile may be associated with a particular user profile stored by the server(s) 120. For example, as illustrated in FIG. 6, a user profile represented by user identifier 2345 may be associated with a communication profile represented by communications identifier 9012. A communications profile may represent the device identifier(s) associated with the user identifier in the user profile. Moreover, the communications profile may represent the access parameter(s) associated with the device identifier in a group profile and/or user profile. The communications server(s) 125 storage of such communications profiles prevents the need for the server(s) 120 to pass group profile and/or user profile data to the communications server(s) 125 at runtime. That is, a communications profile may store enough data that enables the communications server(s) 125 to perform the processes described herein without needing to receive group profile and/or user profile data from the server(s) 120 at runtime.

A particular restricted user may have more than one communications identifier. For example, if the restricted user's parents are separated, the restricted user may live with two separate entities. Each entity may establish different access parameters for the restricted user. The different access parameters could be associated with one or more different device identifiers (e.g., device identifiers representing devices located at the respective habitats), which in turn are associated with different communications identifiers. Each communications identifier may be associated with a different user identifier represented in a different group profile, with each group profile being specific to a different habitat of the restricted user.

FIGS. 7-9B illustrate components that can be used to coordinate communications using a system such as that described herein. FIG. 7 illustrates an example of signaling to initiate a communication session according to the present disclosure. In one example, the server(s) 120 is configured to enable voice commands (e.g., perform ASR, NLU, etc. to identify a spoken command included in audio data), whereas the communications server(s) 125 is configured to enable communication sessions (e.g., using session initiation protocol (SIP)). For example, the communications server(s) 125 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications server(s) 125 may send SIP messages to initiate a single RTP media stream between two endpoints (e.g., direct RTP media stream between the originating device 110 and a recipient device) and/or to initiate and facilitate RTP media connections between the two endpoints (e.g., RTP media streams between the originating device 110 and the communications server(s) 125 and between the communications server(s) 125 and a recipient device). During a communication session, the communications server(s) 125 may initiate two media streams, with a first media stream corresponding to audio data sent from the originating device 110 and to the recipient device and a second media stream corresponding to audio data sent from the recipient device and to the originating device 110, although for ease of explanation this may be illustrated as a single RTP media stream.

As illustrated in FIG. 7, the originating device 110 may send (702) the audio data 311 to the server(s) 120 and the server(s) 120 may determine (704) call information using the audio data 711 and may send (706) the call information to the communications server(s) 125 (e.g., via the communications speechlet 390*a*). The server(s) 120 may determine the call information by performing ASR, NLU, etc., as discussed herein, and the call information may include a data source name (DSN), a number from which to call, a number to which to call, encodings, and/or additional information. For example, the server(s) 120 may identify from which phone number the originating user 5 would like to initiate the call, to which phone number the originating user 5 would like to initiate the call, from which device 110 the originating user 5 would like to perform the call, etc.

While FIG. 7 illustrates the server(s) 120 sending the call information to the communications server(s) 125 in a single step (e.g., 706), the present disclosure is not limited thereto. Instead, the server(s) 120 may send the call information to the originating device 110 and the originating device 110 may send the call information to the communications server(s) 125 in order to initiate the call without departing from the present disclosure. Thus, the server(s) 120 may not communicate directly with the communications server(s) 125 in step 706, or may instead instruct the originating device 110 to communicate with the communications server(s) 125 in order to initiate the call.

The communications server(s) 125 may include an outbound SIP translator 732, an inbound SIP translator 734, and a call state database 740. The outbound SIP translator 732 may include logic to convert commands received from the server(s) 120 into SIP requests/responses and may handle sending outgoing SIP requests and sending responses to incoming SIP requests. After receiving the call information, the outbound SIP translator 732 may persist (708) a SIP dialog using the call state database 740. For example, the DSN may include information such as the name, location, and driver associated with the call state database 740 (and, in some examples, a user identifier and password of the originating user 5) and the outbound SIP translator 732 may send a SIP dialog to the call state database 740 regarding the communication session. The call state database 740 may persist the call state if provided a device identifier and one of a call identifier or a dialog identifier. The outbound SIP translator 732 may send (710) a SIP Invite to a SIP Endpoint 750 (e.g., a recipient device, a Session Border Controller (SBC), or the like). While one SIP Endpoint 750 is illustrated, one skilled in the art will appreciate that SIP invites may be sent to more than one SIP Endpoint (e.g., all devices associated with a same restricted user).

The inbound SIP translator 734 may include logic to convert SIP requests/responses into commands to send to the server(s) 120 and may handle receiving incoming SIP requests and incoming SIP responses. The SIP endpoint 750 may send (712) a 100 TRYING message to the inbound SIP translator 734 and may send (714) a 180 RINGING message to the inbound SIP translator 734. The inbound SIP translator 734 may update (716) the SIP dialog using the call state database 740 and may send (718) a RINGING message to the server(s) 120, which may send (720) the RINGING message to the originating device 110. Alternatively, the inbound SIP translator 734 may send the RINGING message to the originating device 110 without using the server(s) 120 as an intermediary.

When the communication session is accepted by the SIP endpoint 750, the SIP endpoint 750 may send (722) a 200 OK message to the inbound SIP translator 734, the inbound SIP translator 445 may send (724) a startSending message to the server(s) 120, and the server(s) 120 may send (726) the startSending message to the originating device 110. Alternatively, the inbound SIP translator 734 may send the startSending message to the originating device 110 without using the server(s) 120 as an intermediary. The startSending message may include information associated with an internet protocol (IP) address, a port, encoding, or the like required to initiate the communication session. Using the startSending message, the originating device 110 may establish (728) an RTP communication session with the SIP endpoint 750 via the communications server(s) 125. The RTP session may be referred to as direct audio communication functionality as speech captured by one device of the RTP session may be sent as audio data to another device of the RTP session, which outputs the speech to a recipient user.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 8B:
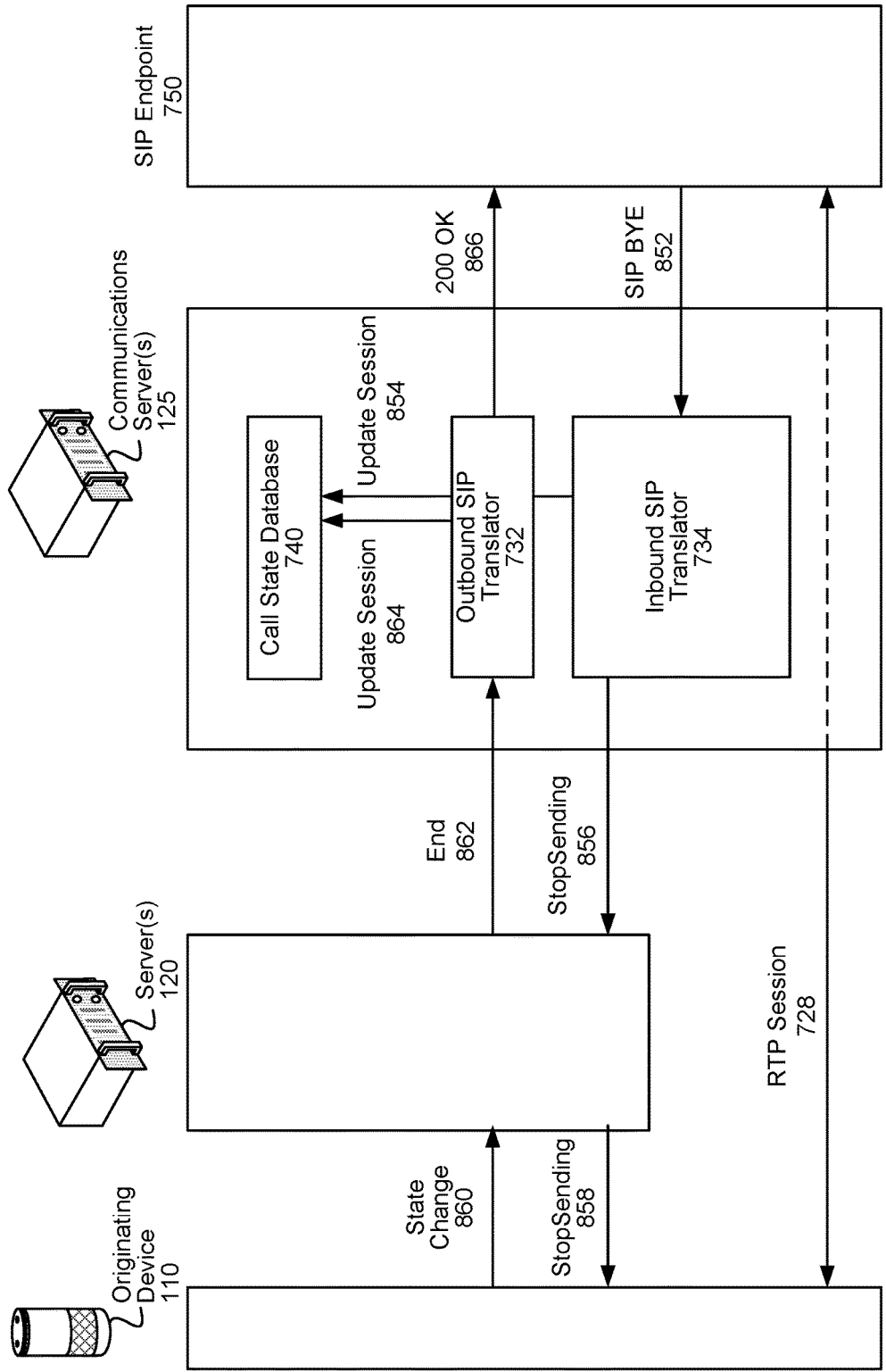

FIGS. 8A and 8B illustrate examples of signaling to end a communication session according to the present disclosure. After establishing the RTP communication session 728 between the originating device 110 and the SIP endpoint 750, the RTP communication session may be ended by the originating user 5 inputting a command, to end the call, to the originating device 110, as illustrated in FIG. 8A, or a recipient user inputting a command, to end the call, to the SIP endpoint 750, as illustrated in FIG. 8B.

As illustrated in FIG. 8A, the originating device 110 may send (802) a state change message to the server(s) 120 and the server(s) 120 may send (804) an end message to the communications server(s) 125. The outbound SIP translator 732 may update (806) the session using the call state database 740 and may send (808) a SIP BYE message to the SIP endpoint 750. The SIP endpoint 750 may send (810) a 200 OK message to the inbound SIP translator 734 and the inbound SIP translator 734 may update (812) the session using the call state database 740. In some examples, the inbound SIP translator 734 may send the 200 OK message to the originating device 110 to confirm the communication session has been ended. Thus, the RTP communication session 728 may be ended between the originating device 110 and the SIP endpoint 750.

As illustrated in FIG. 8B, the SIP endpoint 750 may send (852) a SIP BYE message to the inbound SIP translator 734 and the inbound SIP translator 734 may update (854) the session using the call state database 840. The inbound SIP translator 734 may send (856) a stopSending message to the server(s) 120 and the server(s) 120 may send (858) the stopSending message to the originating device 110. The originating device 110 may send (860) a state change message to the server(s) 120 and the server(s) 120 may send (862) an End message to the outbound SIP translator 732, the End message including a DSN. The outbound SIP translator 732 may then update (864) the session using the call state database 740, and send (866) a 200 OK message to the SIP endpoint 750. Thus, the RTP communication session 728 may be ended between the originating device 110 and the SIP endpoint 750.

While FIGS. 8A and 8B illustrate the server(s) 120 acting as an intermediary between the originating device 110 and the communications server(s) 125, the present disclosure is not limited thereto. Instead, steps 802 and 804 may be combined into a single step and the originating device 110 may send the state change message and/or the End message to the communications server(s) 125 without using the server(s) 120 as an intermediary. Similarly, steps 866 and 858 may be combined into a single step and the communications server(s) 125 may send the StopSending message to the originating device 110 without using the server(s) 120 as an intermediary, and/or steps 860 and 862 may be combined into a single step and the originating device 110 may send the state change message and/or the End message to the communications server(s) 125 without using the server(s) 120 as an intermediary.

While FIGS. 7, 8A, and 8B illustrate the RTP communication session 728 being established between the originating device 110 and the SIP endpoint 750, the present disclosure is not limited thereto and the RTP communication session 728 may be established between the originating device 110 and a telephone network associated with the SIP endpoint 750 without departing from the present disclosure.

Figure 9A:
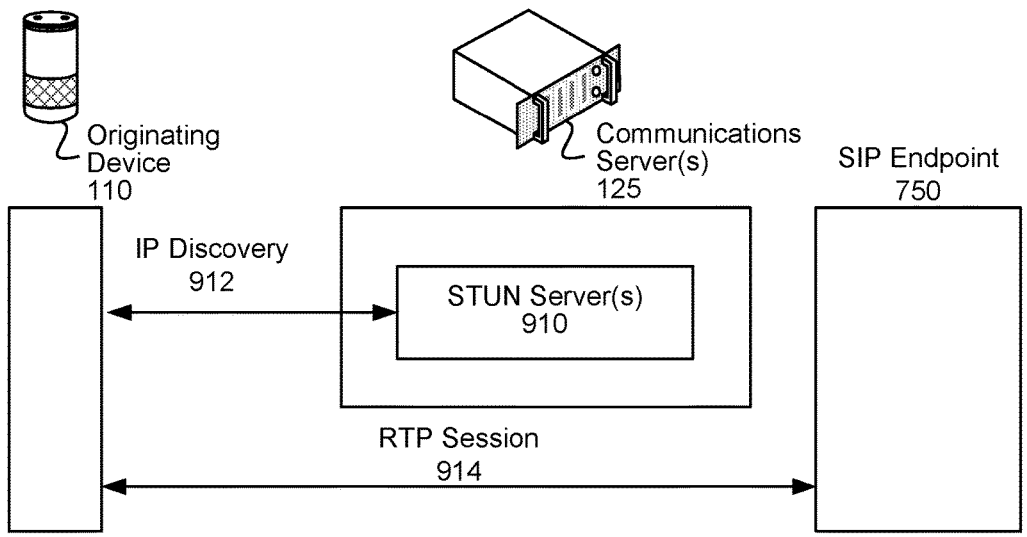
FIGS. 9A and 9B illustrate examples of establishing media connections between devices according to embodiments of the present disclosure.
Figure 9B:
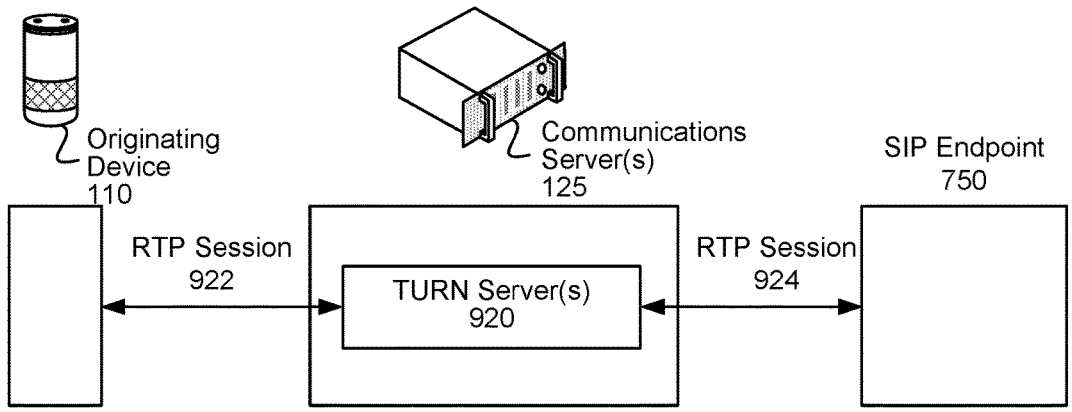

FIGS. 9A and 9B illustrate examples of establishing media connections between devices according to the present disclosure. In some examples, the originating device 110 may have a publicly accessible IP address and may be configured to establish the RTP communication session directly with the SIP endpoint 750. To enable the originating device 110 to establish the RTP communication session, the communications server(s) 125 may include Session Traversal of User Datagram Protocol (UDP) Through Network Address Translators (NATs) server(s) (e.g., STUN server(s) 910). The STUN server(s) 910 may be configured to allow NAT clients (e.g., an originating device 110 behind a firewall) to setup calls to a VoIP provider hosted outside of the local network by providing a public IP address, the type of NAT they are behind, and a port identifier associated by the NAT with a particular local port. As illustrated in FIG. 9A, the originating device 110 may perform (912) IP discovery using the STUN server(s) 910 and may use this information to set up an RTP communication session 914 (e.g., UDP communication) between the originating device 110 and the SIP endpoint 750 to establish a call.

In some examples, the originating device 110 may not have a publicly accessible IP address. For example, in some types of NAT the originating device 110 cannot route outside of the local network. To enable the originating device 110 to establish an RTP communication session, the communications server(s) 125 may include Traversal Using relays around NAT (TURN) server(s) 920. The TURN server(s) 920 may be configured to connect the originating device 110 to the SIP endpoint 750 when the originating device 110 is behind a NAT. As illustrated in FIG. 9B, the originating device 110 may establish (922) an RTP session with the TURN server(s) 920 and the TURN server(s) 920 may establish (924) an RTP session with the SIP endpoint 750. Thus, the originating device 110 may communicate with the SIP endpoint 750 via the TURN server(s) 920. For example, the originating device 110 may send audio data to the communications server(s) 125 and the communications server(s) 125 may send the audio data to the SIP endpoint 750. Similarly, the SIP endpoint 750 may send audio data to the communications server(s) 125 and the communications server(s) 125 may send the audio data to the originating device 110.

In some examples, the system may establish communication sessions using a combination of the STUN server(s) 910 and the TURN server(s) 920. For example, a communication session may be more easily established/configured using the TURN server(s) 920, but may benefit from latency improvements using the STUN server(s) 910. Thus, the system may use the STUN server(s) 910 when the communication session may be routed directly between two devices and may use the TURN server(s) 920 for all other communication sessions. Additionally or alternatively, the system may use the STUN server(s) 910 and/or the TURN server(s) 920 selectively based on the communication session being established. For example, the system may use the STUN server(s) 910 when establishing a communication session between two devices (e.g., point-to-point) within a single network (e.g., corporate LAN and/or WLAN), but may use the TURN server(s) 920 when establishing a communication session between two devices on separate networks and/or three or more devices regardless of network(s). When the communication session goes from only two devices to three or more devices, the system may need to transition from the STUN server(s) 910 to the TURN server(s) 920. Thus, if the system anticipates three or more devices being included in the communication session, the communication session may be performed using the TURN server(s) 920. When the communication session goes from three or more devices to only two devices, the system may need to transition from the TURN server(s) 920 to the STUN server(s) 910.

Figure 10:
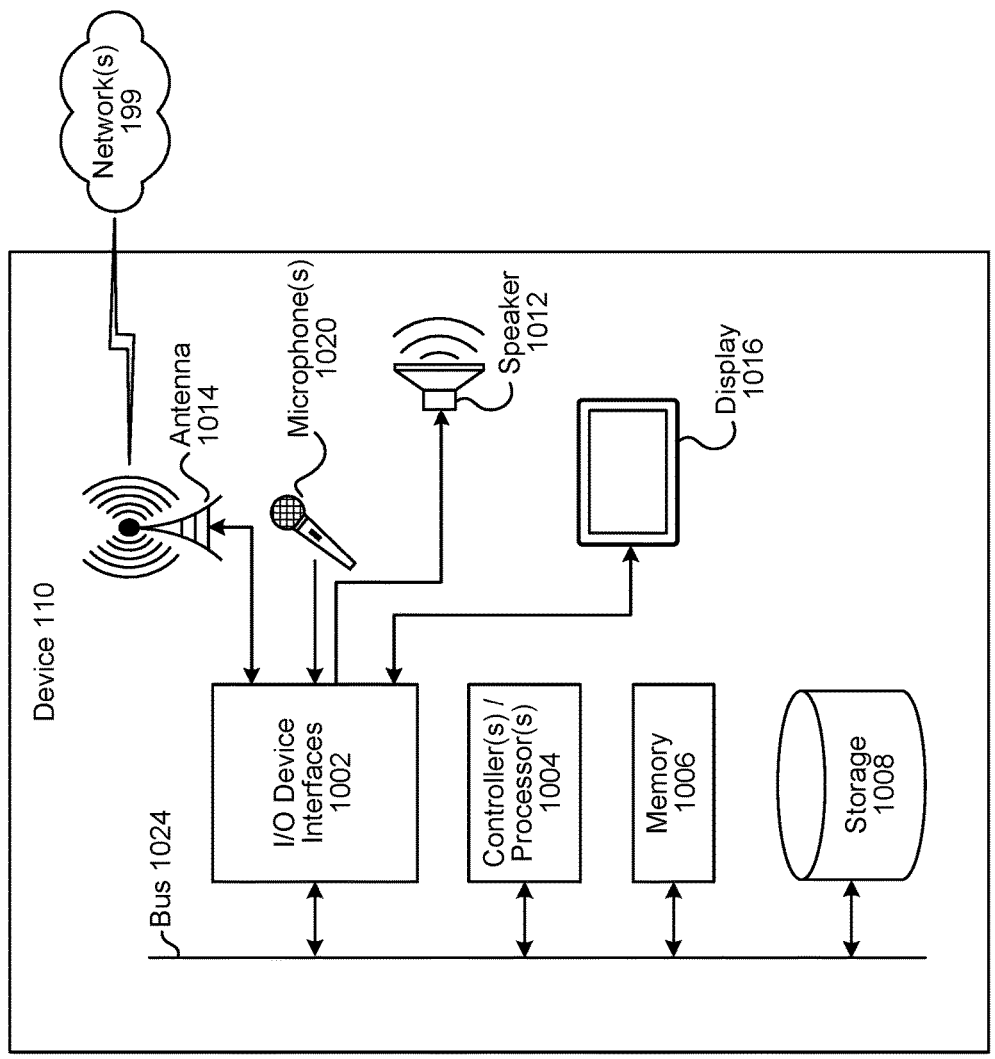
FIG. 10 is a block diagram conceptually illustrating example components of a device according to embodiments of the present disclosure.
Figure 11:
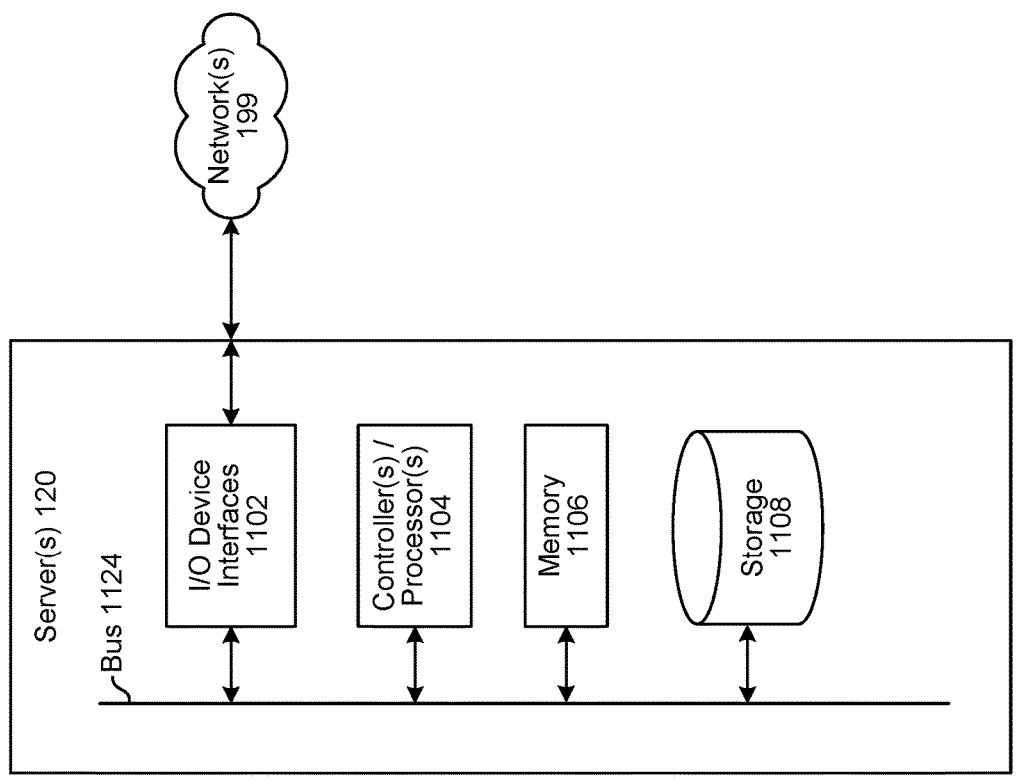
FIG. 11 is a block diagram conceptually illustrating example components of a server according to embodiments of the present disclosure.

FIG. 10 is a block diagram conceptually illustrating a device 110 that may be used with the system. FIG. 11 is a block diagram conceptually illustrating example components of a remote device, such as the server(s) 120, which may assist with ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that is connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1002/1102), processor(s) (1004/1104), memory (1006/1106), and/or storage (1008/1108) of the device(s) 110 and server(s) 120, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 12:
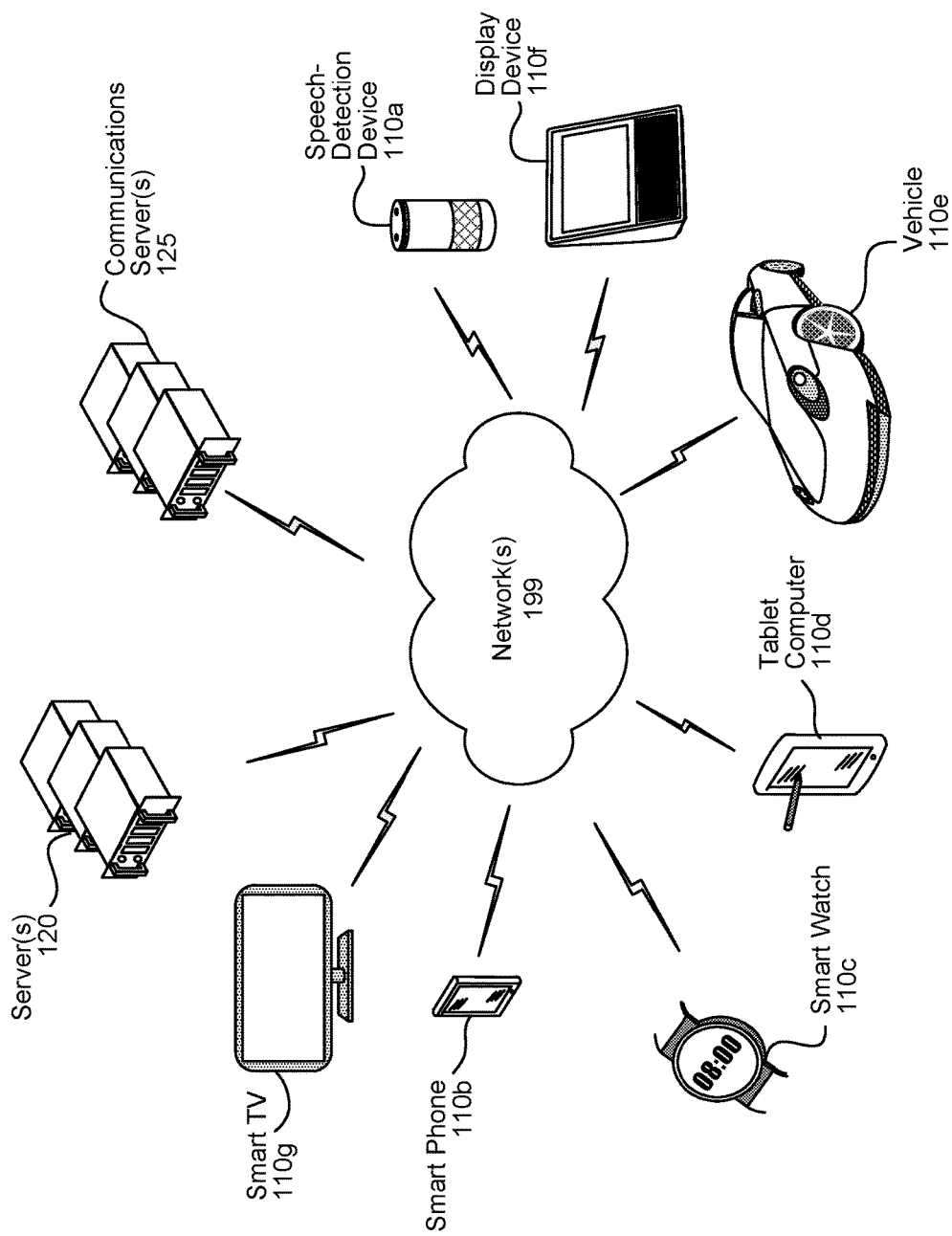
FIG. 12 illustrates an example of a computer network for use with the speech processing system.

As illustrated in FIG. 12, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the communications server(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   receiving, from a first device associated with a first user, a first request to call a second user using a direct audio communication protocol;
   determining a user identifier associated with the second user, the user identifier representing the second user is a child;
   determining group profile data associated with the user identifier;
   determining the group profile data is associated with a communal device, the communal device being associated with all user identifiers represented in the group profile data;
   determining the group profile data is associated with a child device associated with the user identifier, the child device being unassociated with other user identifiers represented in the group profile data;
   determining a list of contacts associated with the child device, the list of contacts representing a plurality of users that are permitted to call the second user;
   determining the list of contacts includes the first user; and
   causing a first direct audio communication session to be established with the first device and the child device based at least in part on the communal device being associated with all user identifiers represented in the group profile data and the child device being associated with the user identifier but unassociated with other user identifiers represented in the group profile data.

2. The method of claim 1, further comprising:
   receiving, from the child device, audio data representing speech of the second user;
   performing speech processing on the audio data to generate text data representing the speech;
   determining the text data corresponds to a second request to call a third user;
   after determining the text data corresponds to the second request, determining the list of contacts includes the third user;
   determining at least one device associated with the third user; and
   causing a third direct audio communication session to be established with the child device and the at least one device.

3. The method of claim 1, further comprising:
   receiving, from the child device, first audio data representing speech of the second user;
   performing speech processing on the first audio data to generate first text data representing the speech;
   determining the first text data corresponds to a second request to call a third user;
   after determining the first text data corresponds to the second request, determining the third user is missing from the list of contacts;
   generating second text data representing the call cannot be established;
   performing text-to-speech processing on the second text data to generate second audio data; and
   causing the child device to output audio representing the second audio data.

4. The method of claim 1, further comprising:
   receiving, from a second device, a first indication to establish at least one access parameter for the second user;
   determining a second user identifier associated with the first indication, the second user identifier representing a parent user;
   determining the second user identifier is represented in the group profile data;
   determining the group profile data represents the parent user is permitted to establish at least one access parameter for the second user;
   receiving, from the second device, a second indication representing the list of contacts;
   after receiving the second indication, determining the child device is associated with the second user; and
   associating the list of contacts with the child device.

5. A method, comprising:
   receiving, from a first device associated with a first user identifier, a first request to communicate with a second user identifier;
   determining group profile data associated with the second user identifier;
   determining the group profile data is associated with a communal device, the communal device being associated with a third user identifier;
   determining the group profile data is associated with a second device associated with the second user identifier, the second device being unassociated with the third user identifier; and
   causing the second device to output a first indicator representing the first request.

6. The method of claim 5, further comprising:
   receiving, from the second device, a second request to communicate with a fourth user identifier;
   after receiving the second request, determining the fourth user identifier is represented in a permitted list of contacts associated with the second device;
   determining at least one device associated with the fourth user identifier; and causing the at least one device to output a second indicator representing the second request.

7. The method of claim 5, further comprising:
receiving, from the second device, a second request to communicate with a fourth user identifier;
after receiving the second request, determining the fourth user identifier is missing from a permitted list of contacts associated with the second device; and
causing the second device to output a second indicator representing a second communication attempt will not be sent.

8. The method of claim 5, further comprising:
receiving, from a third device associated with a fourth user identifier, a second indicator requesting establishment of at least one access parameter for the second user identifier;
determining the fourth user identifier is associated with the group profile data;
determining the group profile data represents the fourth user identifier is permitted to establish at least one access parameter for the second user identifier;
receiving, from the third device, a third indicator representing the first access parameter;
after receiving the third indicator, determining the second device is associated with the second user identifier; and
associating the first access parameter with the second device.

9. The method of claim 5, further comprising:
determining the group profile data is associated with a third device associated with the second user identifier;
determining the third device is associated with the second user identifier and unassociated with the third user identifier; and
causing the third device to output a second indicator representing the first request.

10. The method of claim 5, further comprising:
receiving, from the second device, a second request to communicate with a fourth user identifier, the second device further being associated with a fifth user identifier;
determining an access parameter associated with the fifth user identifier;
determining the access parameter permits the fifth user identifier to communicate with the fourth user identifier;
determining at least one device associated with the fourth user identifier; and
causing the at least one device to output a second indicator representing the second request.

11. The method of claim 5, wherein:
the second device is associated with a device identifier;
the device identifier is associated with the second user identifier in the group profile data; and
the device identifier is unassociated with the third user identifier in the group profile data.

12. The method of claim 5, further comprising:
receiving, from a third device, a second request to communicate with the second user identifier;
determining an access parameter associated with the second device, the access parameter representing when the second device is permitted to indicate the second user identifier has received a message;
determining a present time;
determining, based at least in part on the present time and the access parameter, the second device is restricted from indicating the second user identifier has received a first message corresponding to the second request;
storing the first message; and
after storing the first message and when the second device is again permitted to indicate the second user identifier has received a message, causing the second device to output a second indicator representing the second user identifier has received the first message.

13. A system, comprising:
at least one processor; and
at least one memory comprising instructions that, when executed by the at least one processor, cause the system to:
receive, from a first device associated with a first user identifier, a first request to communicate with a second user identifier;
determine group profile data associated with the second user identifier;
determine the group profile data is associated with a communal device, the communal device being associated with a third user identifier;
determine the group profile data is associated with a second device associated with the user identifier, the second device being unassociated with the third user identifier; and
cause the second device to output a first indicator representing the first request.

14. The system of claim 13, wherein the at least one memory further comprises instructions that, when executed by the at least one processor, further cause the system to:
receive, from the second device, a second request to communicate with a fourth user identifier;
after receiving the second request, determine the fourth user identifier is represented in a permitted list of contacts associated with the second device;
determine at least one device associated with the fourth user identifier; and
cause the at least one device to output a second indicator representing the second request.

15. The system of claim 13, wherein the at least one memory further comprises instructions that, when executed by the at least one processor, further cause the system to:
receive, from the second device, a second request to communicate with a fourth user identifier;
after receiving the second request, determine the fourth user identifier is missing from a permitted list of contacts associated with the second device; and
cause the second device to output a second indicator representing a second communication attempt will not be sent.

16. The system of claim 13, wherein the at least one memory further comprises instructions that, when executed by the at least one processor, further cause the system to:
receive, from a third device associated with a fourth user identifier, a second indicator requesting establishment of at least one access parameter for the second user identifier;
determine the fourth user identifier is associated with the group profile data;
determine the group profile data represents the fourth user identifier is permitted to establish at least one access parameter for the second user identifier;
receive, from the third device, a third indicator representing the first access parameter;
after receiving the third indicator, determine the second device identifier is associated with the second user identifier; and
associate the first access parameter with the second device.

17. The system of claim 13, wherein the at least one memory further comprises instructions that, when executed by the at least one processor, further cause the system to:
- determine the group profile data is associated with a third device associated with the second user identifier;
- determine the third device is associated with the second user identifier and unassociated with the third user identifier; and
- cause the third device to output a second indicator representing the first request.

18. The system of claim 13, wherein the at least one memory further comprises instructions that, when executed by the at least one processor, further cause the system to:
- receive, from the second device, a second request to communicate with a fourth user identifier, the second device further being associated with a fifth user identifier;
- determine an access parameter associated with the fifth user identifier;
- determine the access parameter permits the fifth user identifier to communicate with the fourth user identifier;
- determine at least one device associated with the fourth user identifier; and
- cause the at least one device to output a second indicator representing the second request.

19. The system of claim 13, wherein:
- the second device is associated with a device identifier;
- the device identifier is associated with the second user identifier in the group profile data; and
- the device identifier is unassociated with the third user identifier in the group profile data.

20. The system of claim 13, wherein the at least one memory further comprises instructions that, when executed by the at least one processor, further cause the system to:
- receive, from a third device, a second request to communicate with the second user identifier;
- determine an access parameter associated with the second device, the access parameter representing when the second device is permitted to indicate the second user identifier has received a message;
- determine a present time;
- determine, based at least in part on the present time and the access parameter, the second device is restricted from indicating the second user identifier has received a first message corresponding to the second request;
- store the first message; and
- after storing the first message and when the second device is again permitted to indicate the second user identifier has received a message, cause the second device to output a second indicator representing the second user identifier has received the first message.

* * * * *